United States Patent [19]

Grimsrud et al.

[11] Patent Number: 5,787,296
[45] Date of Patent: Jul. 28, 1998

[54] METHOD AND APPARATUS FOR REDUCING POWER CONSUMPTION BY A DISK DRIVE THROUGH DISK BLOCK RELOCATION

[75] Inventors: Knut Grimsrud, Aloha; Rick Coulson, Portland, both of Oreg.

[73] Assignee: Intel Corporation, Santa Clara, Calif.

[21] Appl. No.: 721,840

[22] Filed: Sep. 27, 1996

Related U.S. Application Data

[63] Continuation-in-part of Ser. No. 708,983, Sep. 6, 1996.
[51] Int. Cl.[6] .................................................. G06F 1/32
[52] U.S. Cl. ................ 395/750.03; 711/170; 360/72.1
[58] Field of Search .................. 395/750.03, 750.01; 360/69, 97.01, 71, 72.1; 711/170

[56] References Cited

U.S. PATENT DOCUMENTS

| | | | |
|---|---|---|---|
| 4,536,837 | 8/1985 | Olson et al. | 395/621 |
| 5,175,853 | 12/1992 | Kardach et al. | 395/733 |
| 5,274,826 | 12/1993 | Kardach et al. | 395/733 |
| 5,274,834 | 12/1993 | Kardach et al. | 395/733 |
| 5,291,604 | 3/1994 | Kardach et al. | 395/734 |
| 5,423,046 | 6/1995 | Nunnelley et al. | 395/750.07 |
| 5,471,604 | 11/1995 | Hasbun et al. | 395/404 |
| 5,600,840 | 2/1997 | Pearce et al. | 395/750.05 |
| 5,652,873 | 7/1997 | Fecteau et al. | 395/500 |

OTHER PUBLICATIONS

Advanced Power Management (APM) BIOS Interface Specification, published by Intel Corporation and Microsoft Corporation, Revision 1.2, Feb. 1996, pp. i–v and 1–75.
"Adaptive Block Rearrangement", Sedat Akyurek and Kenneth Salem, ACM Transactions on Computer Systems, vol. 13, No. 2, May 1995, pp. 89–121.

*Primary Examiner*—Gopal C. Ray
*Attorney, Agent, or Firm*—Blakely, Sokoloff, Taylor & Zafman

[57] ABSTRACT

An apparatus is programmed with a plurality of programming instructions for generating, if possible, an alternative disk block allocation for a current disk block allocation that will yield reduced overall power consumption for a sequence of disk accesses. In some embodiments, the programming instructions include the logic for tracing the sequence of disk accesses to determine the current disk block allocation, the logic for generating the alternative disk block allocation, if possible, using the trace results, and the logic for effectuating the alternate disk block allocation, if generated. In one particular embodiment, the logic for generating the alternative disk block allocation employs a random search approach, while in another embodiment, the logic for generating the alternative disk block allocation employs a heuristic approach.

38 Claims, 10 Drawing Sheets

METHOD AND APPARATUS FOR REDUCING POWER CONSUMPTION BY A DISK DRIVE THROUGH DISK BLOCK RELOCATION

RELATED APPLICATION

This application is a continuation-in-part application of U.S. patent application Ser. No. 08/708,983, filed on Sep. 6, 1996, and entitled "Method and Apparatus For Improving Disk Drive Performance".

BACKGROUND OF THE INVENTION

1. Field of the Invention

The present invention relates to the field of computer systems. More specifically, the present invention relates to power consumption by disk drives of computer systems.

2. Background Information

Managing power consumption by a computer system is known in the art. Reference is made to U.S. Pat. No. 5,175,853, entitled Transparent System Interrupt, U.S. Pat. No. 5,274,854, entitled Transparent System Interrupt With Integrated Extended Memory Addressing, U.S. Pat. No. 5,291,604, Transparent System Interrupt With Automated Halt State Restart, and U.S. Pat. No. 5,274,826, Transparent System Interrupt With Automated Input/Output Trap Restart, assigned to the assignee of the present invention. Reference is also made to Advanced Power Management (APM) BIOS Interface Specification, February 1996, jointly published by Microsoft Inc., of Redmond, Wash., and Intel Corporation of Santa Clara, Calif.

Typically, power consumption is reduced by putting the computer system in a lower power state when the computer system has been idle for an "extended" period of time, and bringing the computer system back into a full power state when usage of the computer system is desired again. The lower power state may be achieved through dimming a display, spinning down a disk drive, slowing down or dropping the voltage supplied to the processor, and so forth.

While all these techniques have made significant contribution to reducing power consumption by computer system, and extending battery lives in the case of battery powered computer systems, the problem is never totally solved. It is always desirable to be able to further reduce power consumption, especially in the case of portable computer systems. Moreover, the above described techniques tend to be centered around power savings in the idle state, while it is during operation when most of the power is consumed. Thus, it is especially desirable if power consumption can be reduced during operation.

SUMMARY OF THE INVENTION

An apparatus is programmed with a plurality of programming instructions for generating, if possible, an alternative disk block allocation for a current disk block allocation that will reduce the amount of head movements by a disk drive for a sequence of disk accesses against the disk drive, thereby reducing the power consumed by the disk drive during operation. In some embodiments, the programming instructions include the logic for tracing the sequence of disk accesses to determine the current disk block allocation, and the logic for generating the alternative disk block allocation, if possible, using the trace results, and the logic for effectuating the alternate disk block allocation, if generated. In one particular embodiment, the logic for generating the alternative disk block allocation employs a random search approach, while in another embodiment, the logic for generating the alternative disk block allocation employs a heuristic approach.

In some embodiments, the apparatus is a computer system, with the programming instructions being packaged as a stand alone utility in one embodiment, and an integral part of an installation procedure of an application in another. In other embodiments, the apparatus is a disk drive with the programming instructions being integrated with the disk controller.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
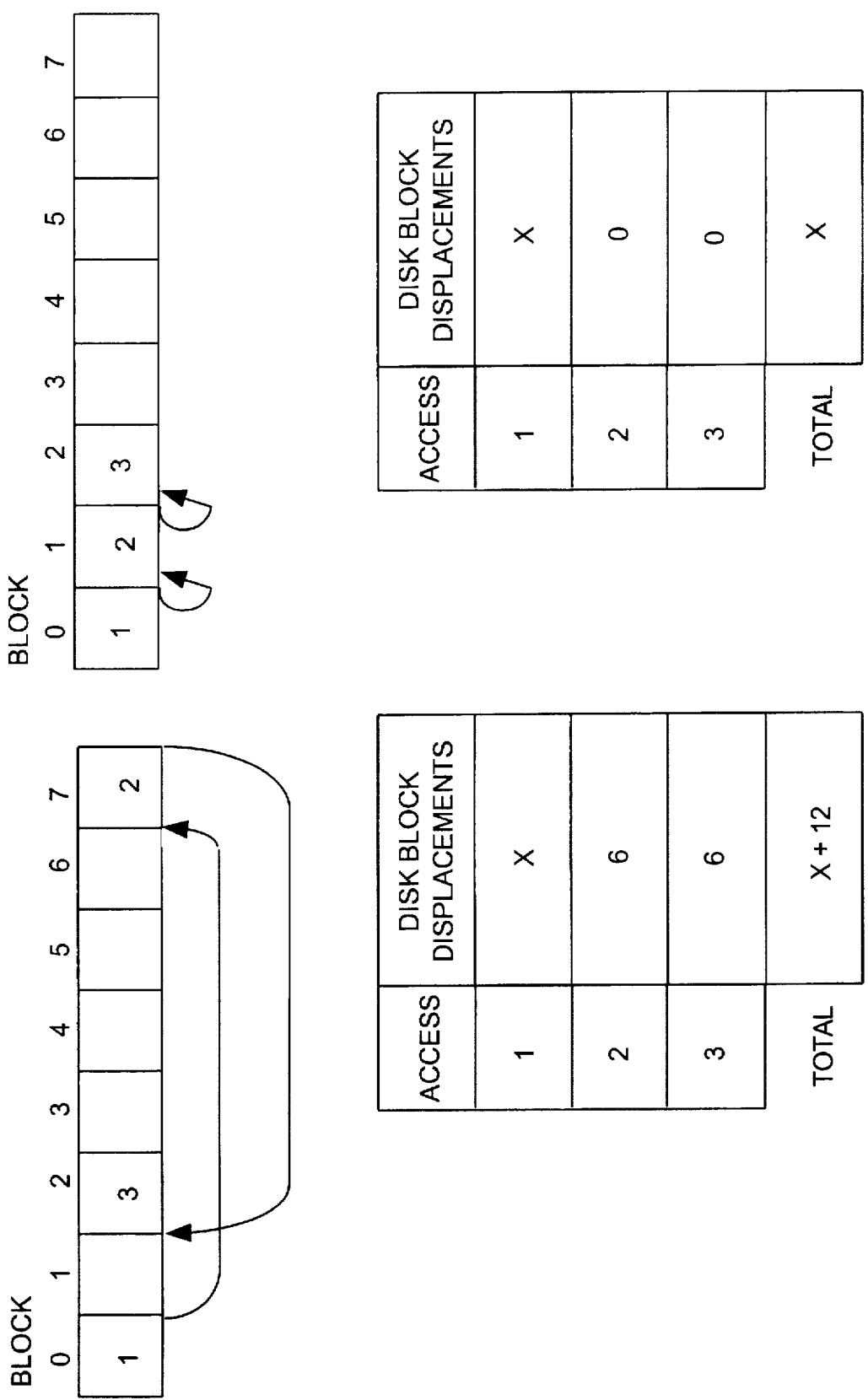
FIG. 1 is a simplified illustration of the present invention.

Referring now to FIG. 1, wherein a simplified illustration of the present invention is shown. Illustrated on the top half of the figure are two simplified block representations 10a and 10b of a disk drive having eight blocks, block 0 through block 7. Denoted therein inside the blocks accessed by the three accesses of a simple sequence of disk accesses are the access identifiers, access 1, access 2 and access 3. The access pattern denoted in simplified block representation 10a illustrates the manner in which the three accesses are made, under an hypothetical disk block allocation, without optimization in accordance with the present invention, whereas the access pattern denoted in simplified block representation 10b illustrates the manner in which the same three accesses are made, under an alternate optimized disk block reallocation, wherein the data previously stored in block 7 have been moved to block 1, in accordance with the present invention.

Illustrated in the bottom half of the figure are the amount of head movements in terms of disk blocks for the three accesses under the unoptimized and optimized disk block allocations. As shown, and readily appreciated by those skilled in the art, under the optimized disk block allocation, significant amount of power savings will be achieved due to reduced head movements and reduced active time for the electronic components of the disk drive, as the block displacement and seek time between the successive accesses are much smaller, as compared to the unoptimized disk block allocation. In other words, by reallocating disk blocks, if it can be done, significant power reduction can be achieved for a sequence of disk accesses.

As will be readily appreciated by those skilled in the art, the above simplified illustration is merely provided for ease of understanding. The problem addressed by the present invention is many times more complex than the simplified illustration. The lengths of the access sequences that are of interest are typically significantly longer. Additionally, many blocks are accessed multiple times in one sequence, and the multiple accesses are not necessarily in the same order. In other words, block x may be accessed n times in a sequence of interest, the first time after accessing block y, the second time after accessing block z, and so forth. Furthermore, not all blocks are available for re-allocation. Thus, the optimized disk block reallocation is seldom as simple as reallocating the disk blocks into a group of contiguous disk blocks, as illustrated by block representation 10b.

Figure 2:
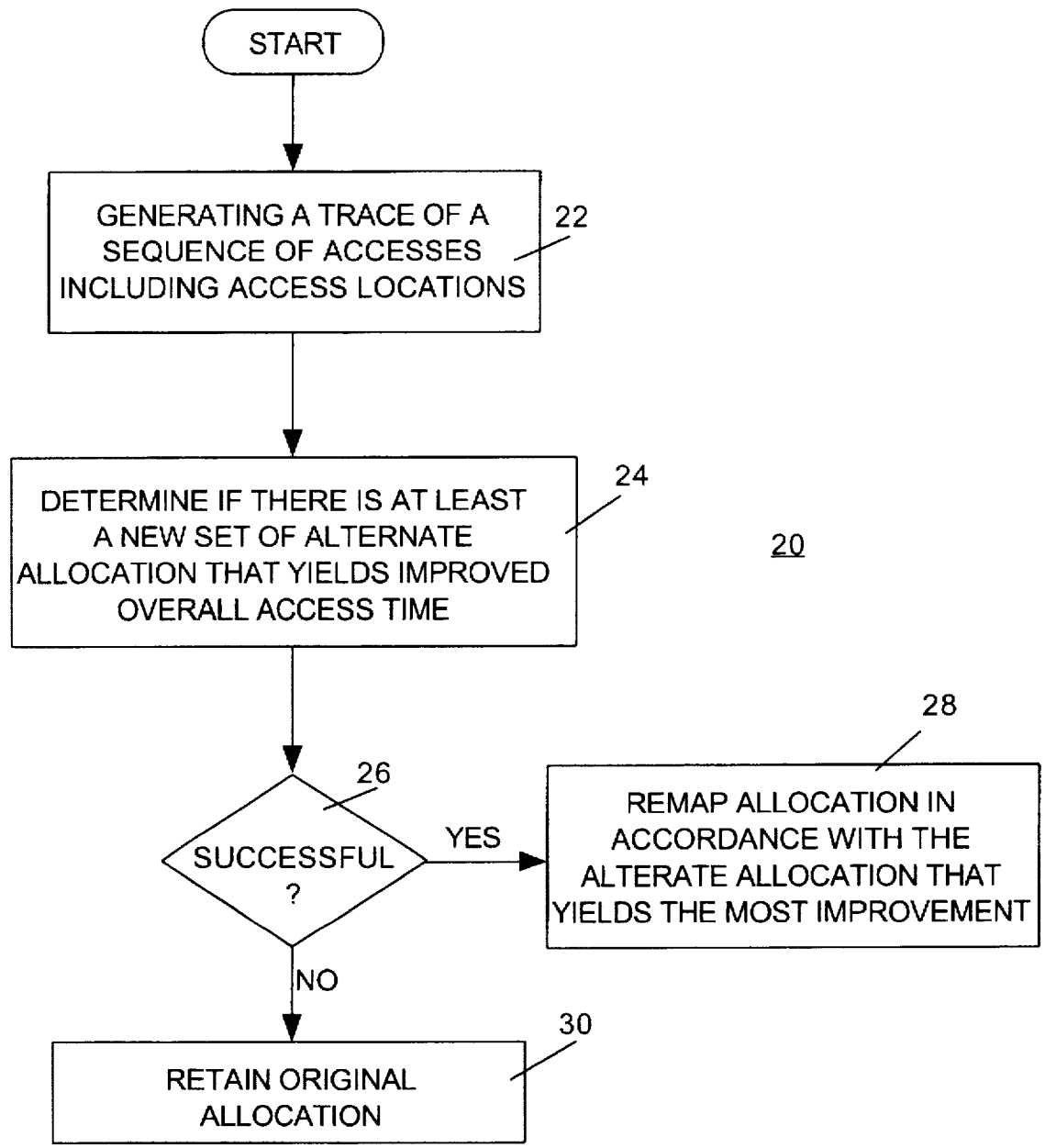
FIG. 2 illustrates one embodiment of the method steps of the present invention.

FIG. 2 illustrates one embodiment of the method steps of the present invention. As shown, for the illustrated embodiment, a trace is first generated for a sequence of disk accesses that are of interest, step 22. The trace includes information such as the disk locations accessed. Next, one or more attempts are made to generate an alternate disk block allocation that will yield reduced power consumption, as determined by a cost function, step 24. An example of a simple cost function, for illustrative purpose, is $P=d \times c1$, where P=power consumed, d is seek distance, c1 is power consumed per unit of seek distance. If at least one of the attempts is successful, the data are remapped into the alternate disk block allocation that yields the most improvement in overall power reduction, step 28. Otherwise, the original disk block allocation is retained, step 30.

Figure 3:
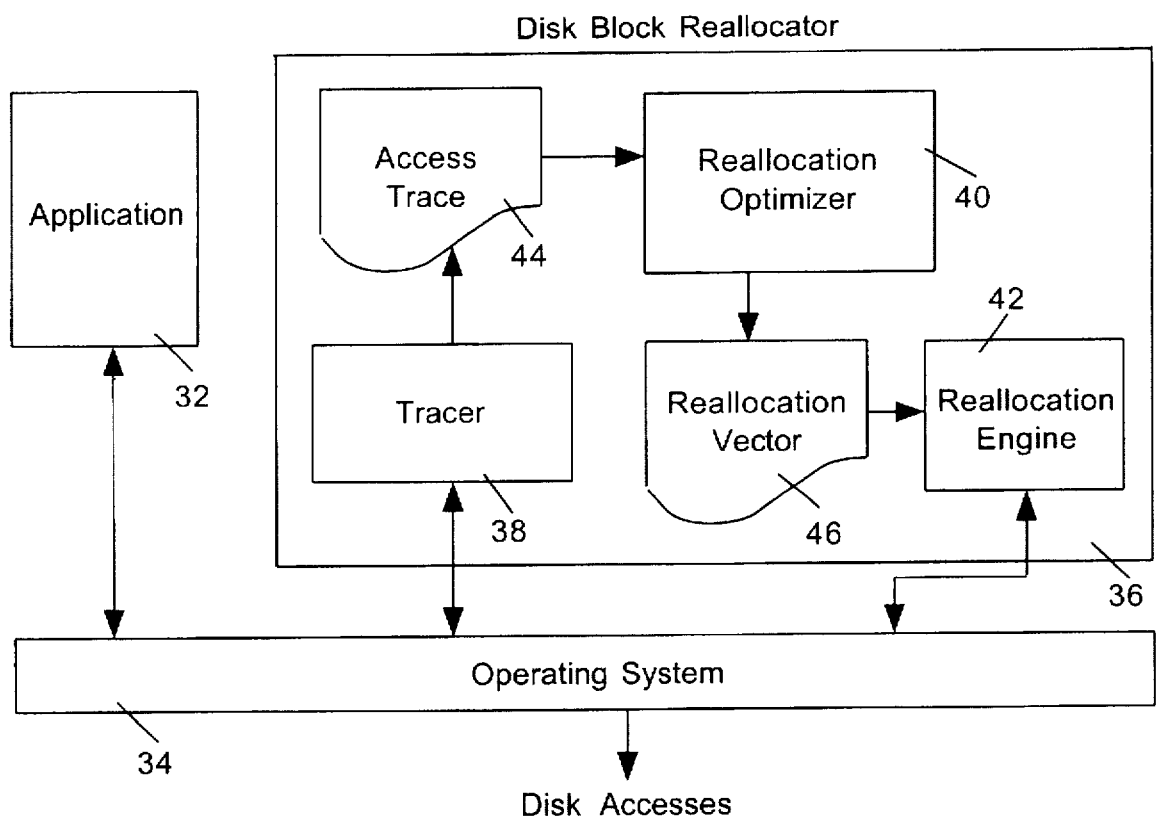
FIG. 3 illustrates one embodiment of the present invention.

FIG. 3 illustrates one embodiment of the present invention. As shown, for the illustrated embodiment, the present invention, disk block reallocator 36, includes tracer 38, reallocation optimizer 40 and reallocation engine 42. Tracer 38 is used to trace disk accesses made by application 32 that are of interest. For the illustrated embodiment, operating system 34 provides I/O read/write services for accessing disk drives, and application 32 utilizes these I/O read/write services when accessing disk drives. Furthermore, operating system 34 provides event notification services, and tracer 38 leverages on these services to trace disk accesses performed by application 32. Tracer 38 logs the trace results in access trace 44.

Reallocation optimizer 40 is used to generate, if possible, an alternate disk block allocation that will yield reduced power consumption for a sequence of disk accesses, using trace results logged in access trace 44. If successful, reallocation optimizer 40 generates reallocation vector 46 setting forth the manner in which the disk blocks should be reallocated. Reallocation engine 42 is used to effectuate the reallocation as stipulated by reallocation vector 46.

While for ease of explanation, disk block reallocator 36 is illustrated as a "separate block" from application 32, as will be appreciated by those skilled in the art, disk block reallocator 36 may be implemented as an integral part of application 32 or separate from application 32. For example, in an integral implementation, disk block reallocator 36 may be implemented as part of the installation procedure to be executed after post-installation of an application to ensure the data required during start up will be accessible through a sequence of deterministic disk accesses to a group of optimally allocated disk blocks. On the other hand, in a separate implementation, disk block reallocator 36 may be implemented as a stand alone utility to be invoked by a user and/or an application. Furthermore, as will be readily appreciated from the description to follow, to those skilled in the art, disk allocator 36 may also be implemented as an integral part of operating system 34 for disk accesses made by the operating system as well as applications, and for the stand alone implementation, disk allocator 36 along with the required operating system support services may be implemented as an integral part of a disk controller.

Figure 4:
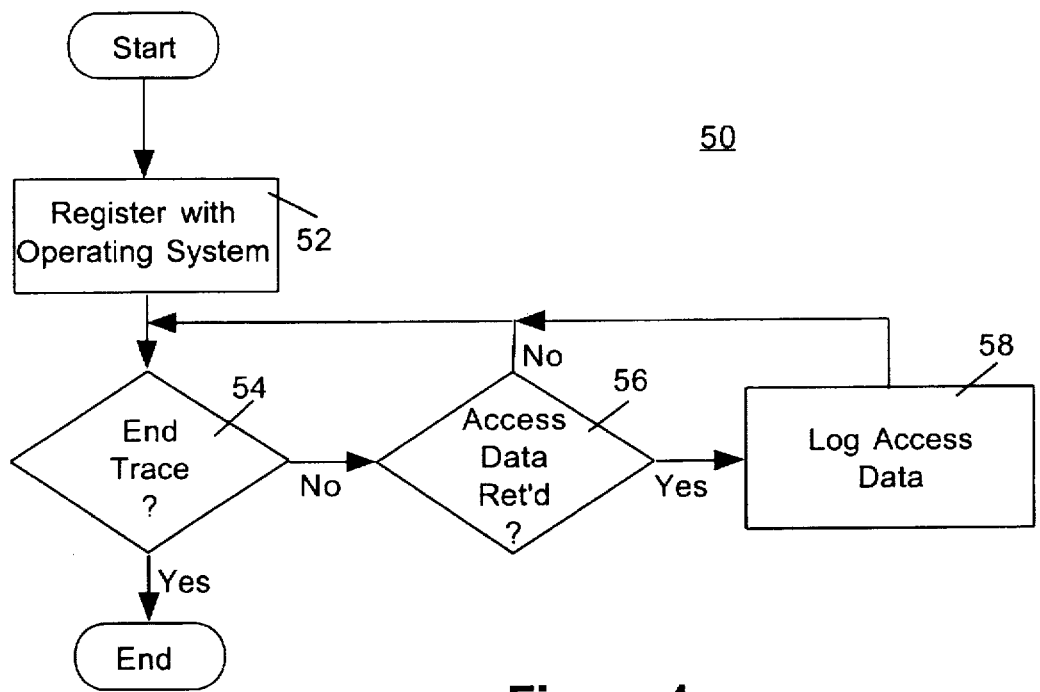
FIG. 4 illustrates one embodiment of the operation flow of the tracer.

FIG. 4 illustrates one embodiment of tracer 38. As shown, for the illustrated embodiment, upon invocation, tracer 38 registers itself with operating system 34, denoting its interest in disk accesses, in particular, the locations accessed, step 52. Upon registering itself, tracer 38 waits for the requested information to be returned from operating system 34, and logs the access data as they are returned, as long as the trace period has not elapsed, steps 54–58. Tracer 38 may be encoded or dynamically provided with the length of the trace period.

Figures 5, 6:
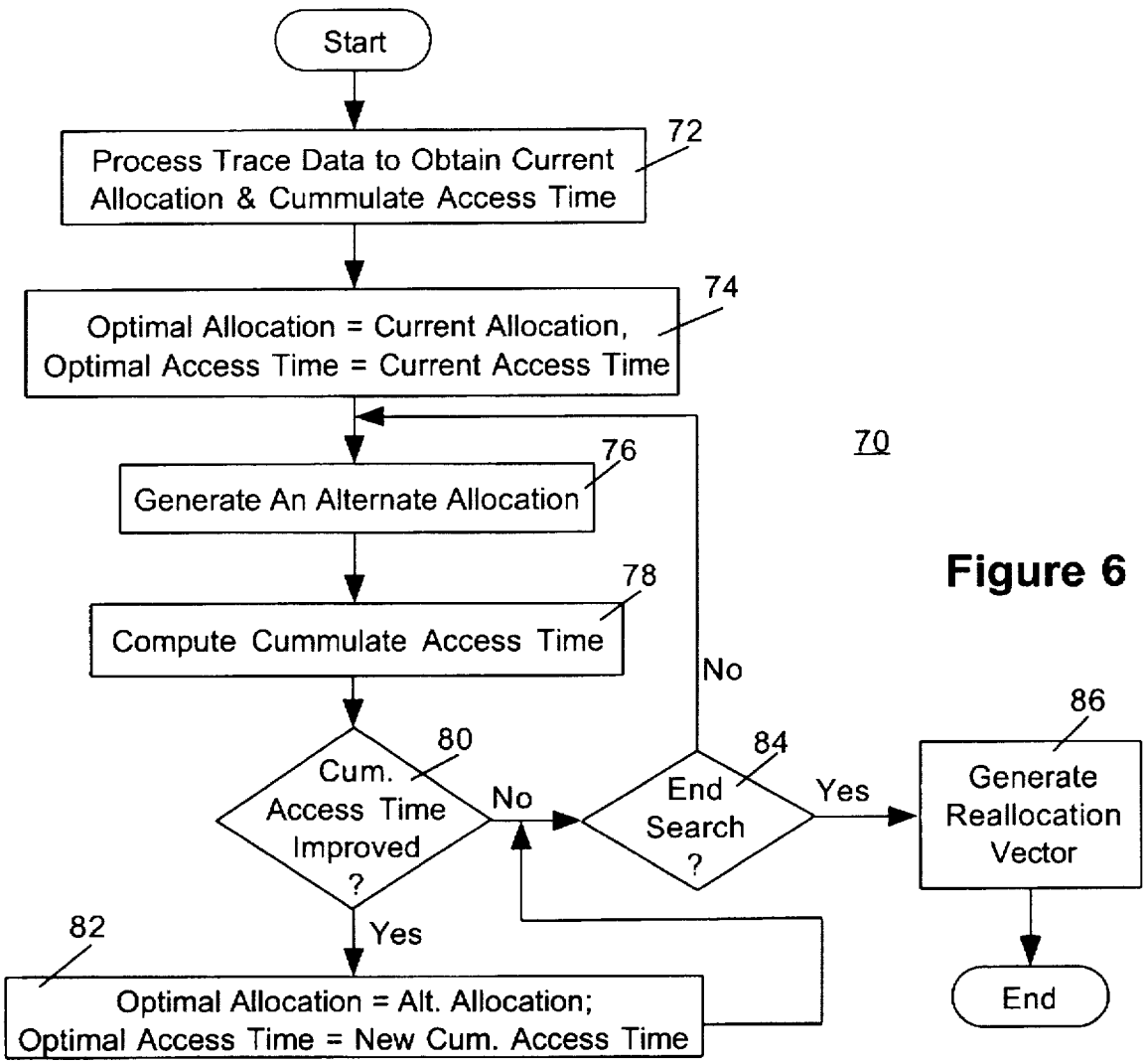
FIG. 5 illustrates one embodiment of the trace log.
FIG. 6 illustrates one embodiment of the operation flow of the reallocation optimizer.

FIG. 5 illustrates one embodiment of access trace 44. As shown, for the illustrated embodiment, access trace 44 includes a number of access records 62. Each access record 62 includes an access identifier 64 identifying the access sequence number, and the disk blocks accessed 66.

FIG. 6 illustrates one embodiment of reallocation optimizer 40. As shown, for the illustrated embodiment, upon invocation, reallocation optimizer 40 processes the trace data recorded in access trace 44 to obtain the current disk block allocation for the sequence of disk accesses of interest, i.e. the disk locations accessed, and in turn generates the cumulative power consumed for the current disk block allocation, step 72. Next, reallocation optimizer 40 notes that current disk block allocation as the optimal disk block allocation, and the current cumulative power consumed as the optimal cumulative power consumed, step 74.

Having done so, reallocation optimizer 40 generates an alternate disk block allocation with randomized incremental changes, step 76. Randomized incremental changes may be synthesized in accordance with any number of such techniques known in the art. Using the generated alternate disk block allocation, reallocation optimizer 40 determine a new cumulative power consumed for the sequence of disk accesses of interest, step 78. If the generated alternate disk block allocation yields improved overall power consumed, i.e. the new cumulative power consumed is smaller than the "optimal" cumulative power consumed, reallocation optimizer 40 notes the generated alternate disk block allocation as the optimal disk block allocation, and the new cumulative power consumed as the optimal cumulative power consumed, step 82. Otherwise, step 82 is skipped.

Steps 76–80 and conditionally step 82 are repeated until a predetermined condition for terminating the search for alternate disk block allocation that yields improved overall power consumption has been met. A variety of termination conditions may be employed. For example, reallocation optimizer 40 may be encoded or dynamically provided with a parameter delimiting the "length" of search, in terms of total evaluation or elapsed time, number of alternate reallocation schemes evaluated, etc. At the conclusion of the search, reallocation optimizer 40 generates reallocation vector 46 denoting the reallocation to be performed, based on the optimal disk block allocation, step 86. For the illustrated embodiment, if the optimal disk block allocation was never updated, i.e. no disk block allocation yielding improved power consumption was found, reallocation vector 46 is a null vector.

Figure 7:
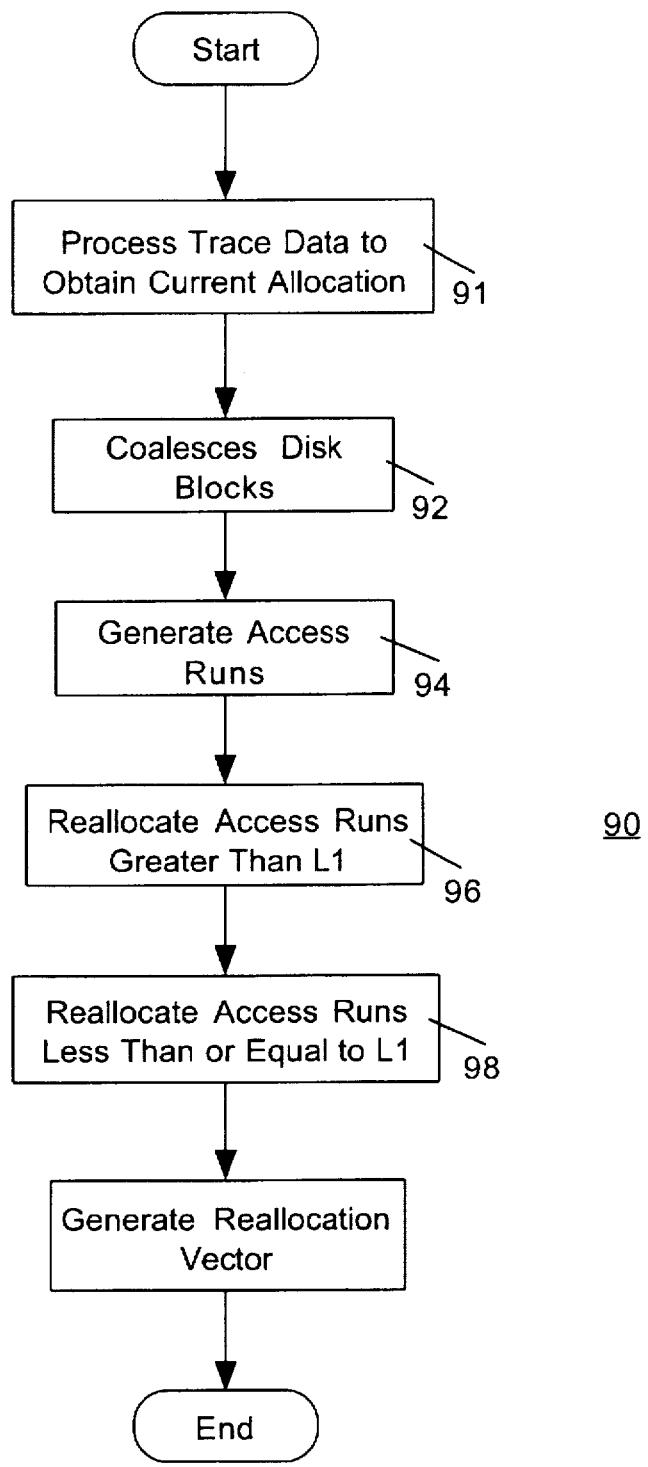
FIG. 7 illustrates an alternative embodiment of the operation flow of the reallocation optimizer.

FIG. 7 illustrates an alternate embodiment of reallocation optimizer 40. As shown, for the illustrated embodiment, upon invocation, similar to the earlier described embodiment, reallocation optimizer 40 processes the trace data recorded in access trace 44 to obtain the current disk block allocation for the sequence of disk accesses of interest, i.e. the disk locations accessed, and in turn computes the cumulative power consumption for the current disk block allocation, step 91. Next, unlike the earlier described embodiment, reallocation optimizer 40 coalesces the disk blocks, step 92. Coalescing the disk blocks may be performed in any one of a number of known techniques. One approach will be briefly described later.

Figure 8:
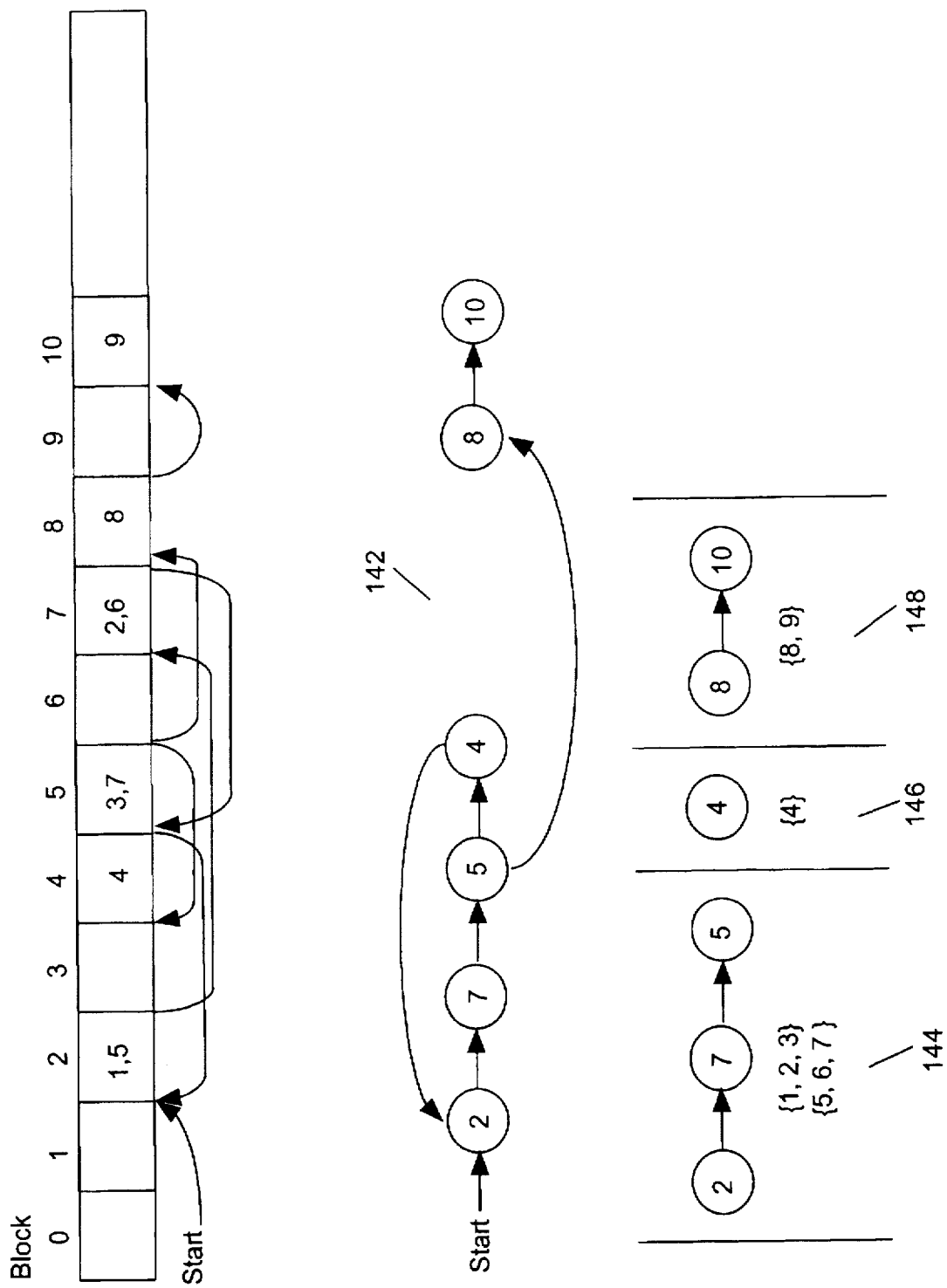
FIG. 8 illustrates in further details the concept of access run.

Having coalesced the disk blocks, reallocation optimizer 40 proceeds to analyze the trace data and groups the disk accesses into access runs, step 94. FIG. 8 illustrates the concept of access runs. Illustrated therein is a hypothetical sequence of disk accesses, access 1 through access 9, against the enumerated blocks in the order shown. For this hypothetical sequence of disk accesses, blocks 2, 7 and 5 are always accessed as a "run". These blocks are accessed in order during access 1 through access 3, and then during access 5 through access 7. Likewise, blocks 8 and 10 are also considered as a "run", except it is accessed only once. Block 4 is a "run" with a run length of one.

Return now to FIG. 7, having grouped the accesses into access runs, reallocation optimizer 40 reallocates the disk block on an access run basis. For the illustrated embodiment, the "longer" access runs are reallocated first, step 96, before the "shorter" access runs are reallocated, step 98. "Longer" access runs are access runs with run lengths greater than a predetermined run length threshold (L1), whereas "shorter" access runs are access runs with run length shorter than L1. The value of L1 is application dependent, and is empirically determined. In one embodiment, L1 is set to 64. After, both the "longer" as well as the "shorter" access runs have been reallocated, reallocation optimizer 40 generates reallocation vector 46 as the earlier described embodiment.

Figure 9:
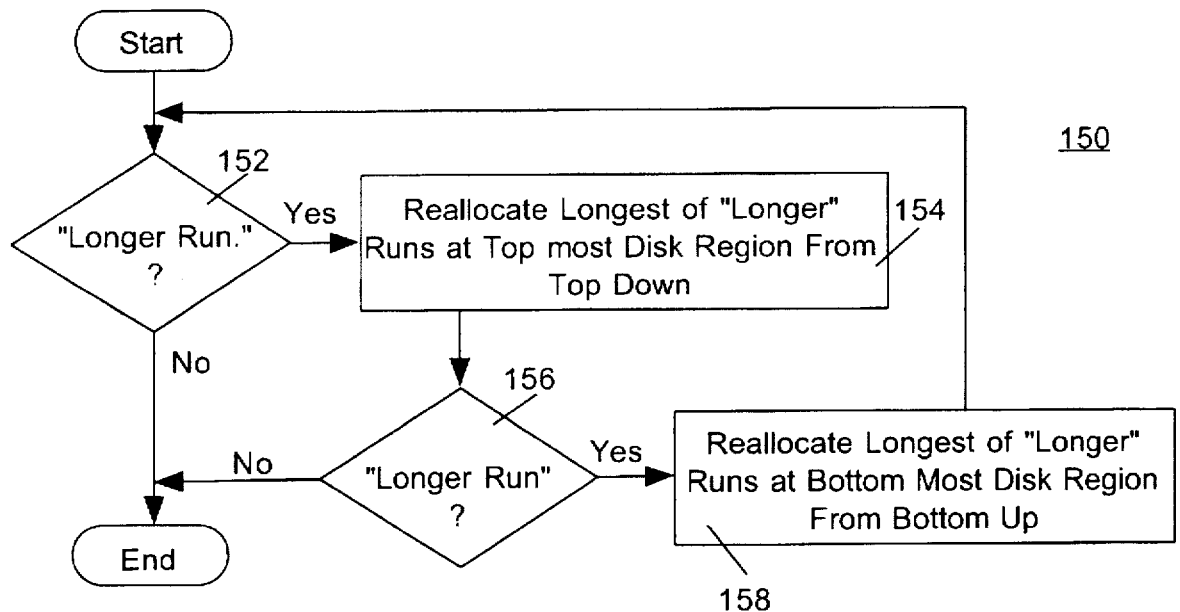
FIG. 9 illustrates in further details one embodiment of the "long access run" reallocation step.
Figure 10:
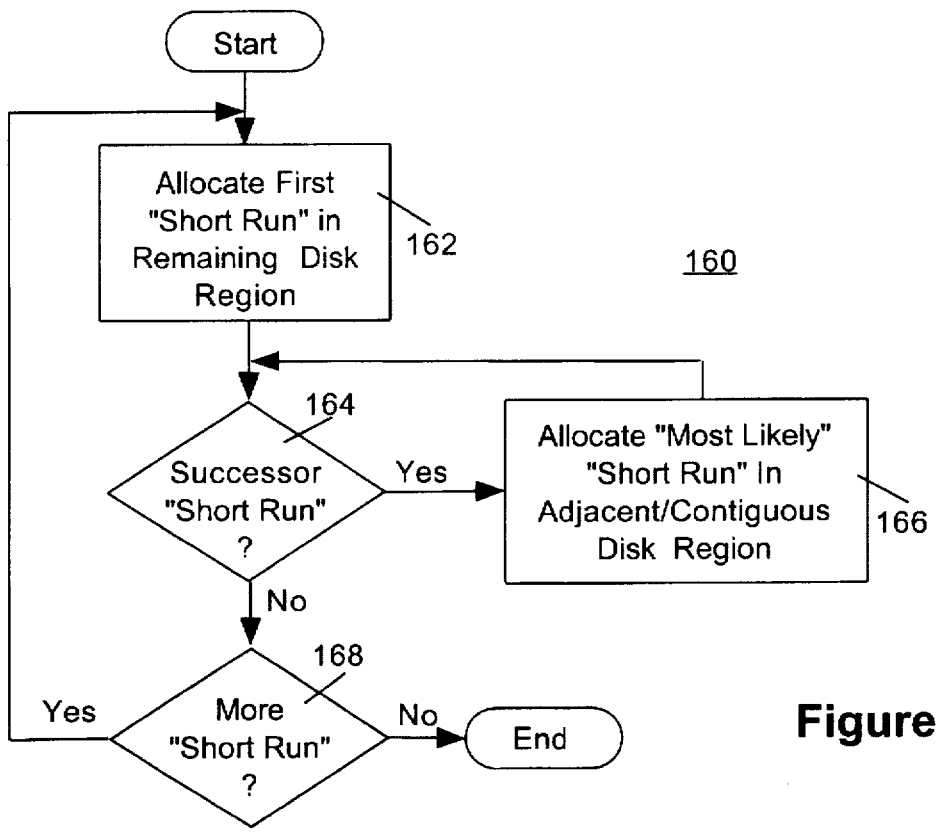
FIG. 10 illustrates in further details one embodiment of the "short access run" reallocation step.
Figure 11:
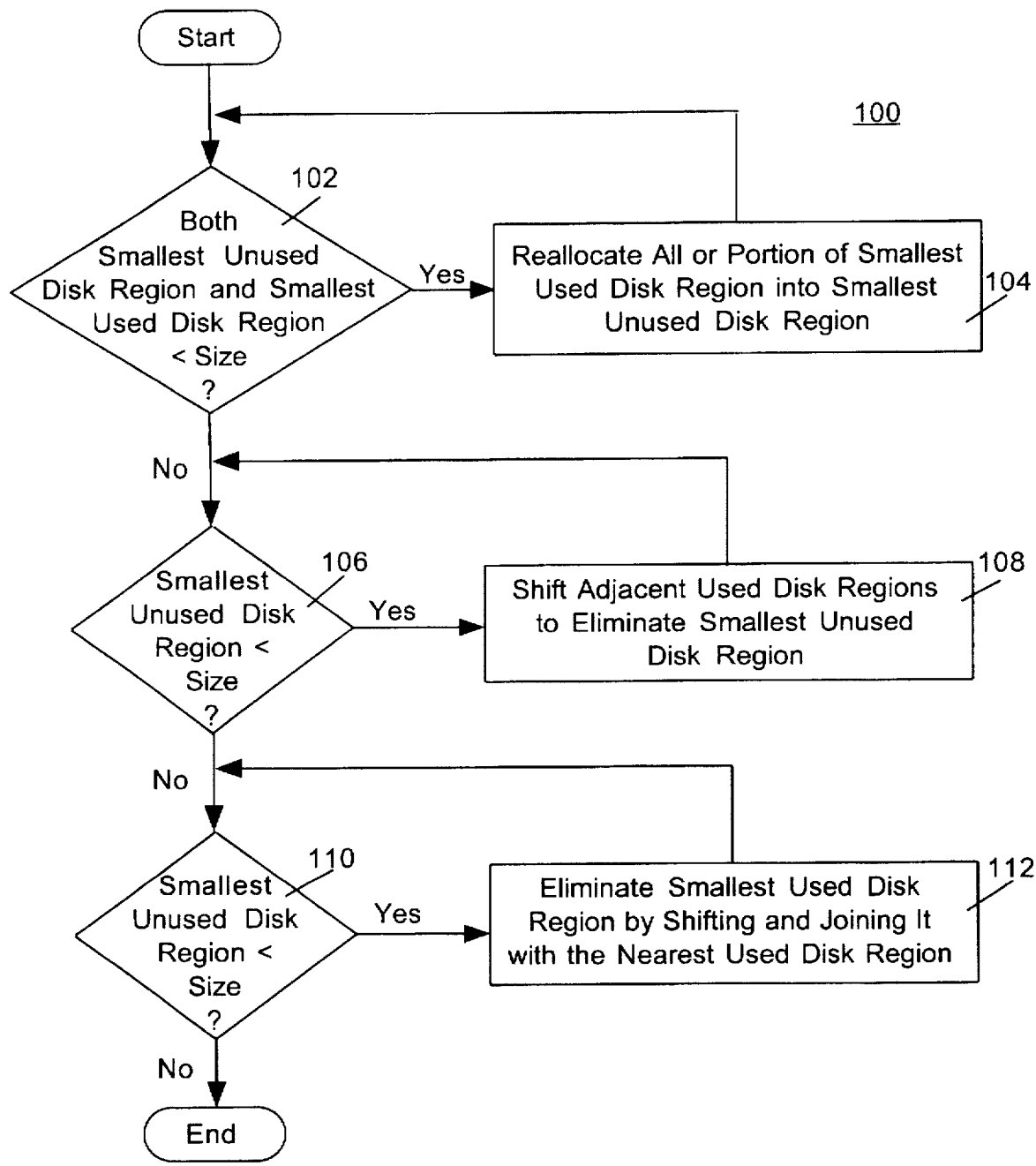
FIGS. 11–14 illustrate in further details one embodiment of the coalescing step.

FIGS. 9–10 illustrate one embodiment each for reallocating the "longer" and "shorter" access runs. As shown in FIG. 9, for the illustrated embodiment, reallocation optimizer 40 reallocates the "longer" access runs to contiguous disk regions at both ends of a disk, alternating between the two ends, until all "longer" access runs have been reallocated. At step 152, reallocation optimizer 40 determines if there are still "longer" access runs to be reallocated. If the determination is affirmative, for the illustrated embodiment, reallocation optimizer 40 reallocates the longest of the remaining "longer" run to the "top most" portion of the disk region, step 154. At step 156, reallocation optimizer 40 again determines if there are still "longer" access runs to be reallocated. If the determination is affirmative, for the illustrated embodiment, reallocation optimizer 40 reallocates the longest of the remaining "longer" run to the "bottom most" portion of the disk region, step 158. Steps 152–158 are repeated until all "longer" access runs have been reallocated. As steps 154 and 158 are repeated, the "top most" portion bound reallocations are reallocated in a "top down" manner, whereas the "bottom most" portion bound reallocation are reallocated in a "bottom up" manner. In other words, the "center" portion of the disk region is left unallocated at the end of the "longer" access run reallocation.

As shown in FIG. 10, for the illustrated embodiment, reallocation optimizer 40 reallocates the "shorter" access runs, by first arbitrarily picking one of the "shorter" access runs, step 162. Then the successor "shorter" access runs to the selected "shorter" access run are reallocated near the selected "shorter" access run based on their likelihood of occurrence, i.e. the frequency of occurrence of the successor "shorter" access run, steps 164–166: A successor access run is simply an access run that follows the selected access run. Steps 164–166 are then repeated until all successor access runs to the selected access run are reallocated. Then, the entire "shorter" access run reallocation process, i.e. steps 162–166 are repeated until all "shorter" access runs have been reallocated.

The two approaches to reallocating "longer" and "shorter" access runs are complementary to each other. Together the two approaches provide the advantage of reducing the block displacements and therefore power consumption of the "shorter" access runs, since they are all concentrated at the "center" portion of the disk region, and the advantage of spreading the higher cost of moving to the end portions of the disk region over a larger number of accesses, since a number of successive accesses will be made at the end portions once the disk head is moved there.

Figure 12:
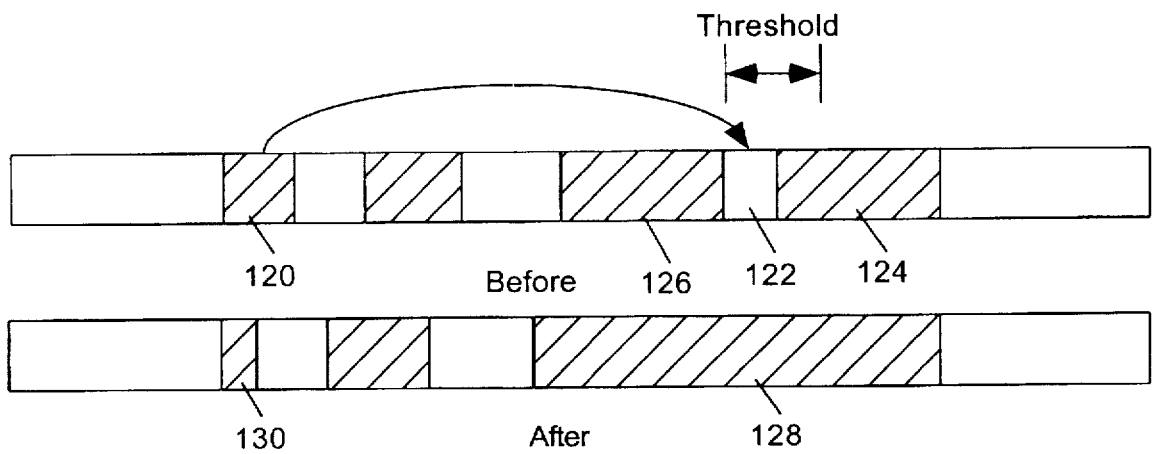

Returning now to the topic of coalescing disk blocks of a disk drive. FIGS. 11–14 illustrate one approach for achieving the desired coalescing of disk blocks. As shown, for the illustrated approach, reallocation optimizer 40 first determines if both the smallest unused disk region[1] as well as the smallest used region are smaller than a predetermined size, step 102. The value of the predetermined size is also application dependent, and empirically determined. In one embodiment, a value of 64 is also used for the predetermined size. If the determination is affirmative, reallocation optimizer 40 reallocates all or a portion of the smallest used disk region into the smallest unused disk region, step 104 (see also FIG. 12). Steps 102-104 are repeated until either the smallest unused disk region or the smallest used disk region is greater than or equal to the predetermined size. Together, these two steps have the effect of filling up the small "in-between" unused disk regions, and eliminate the small "in-between" used disk regions, as illustrated by FIG. 12.

[1]For the purpose of this application, an unused disk region is a disk region not accessed during the trace, the disk region may or may not have been allocated.

Figure 13:
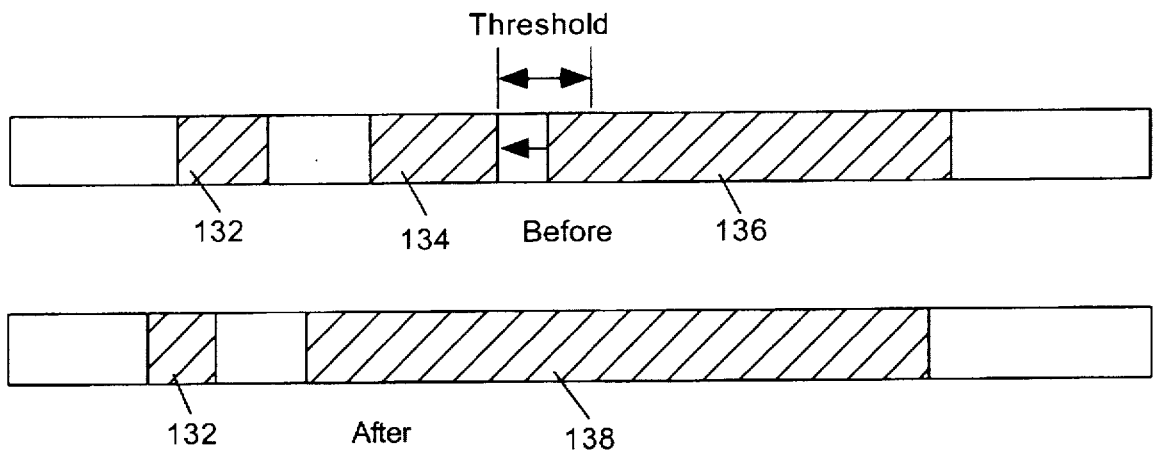

Next, for the illustrated approach, reallocation optimizer 40 determines if the smallest unused disk region is smaller than the predetermined size, step 106. If the determination is affirmative, reallocation optimizer 40 reallocates one or both of the two used disk regions bounding the smallest unused disk region, by shifting one towards the other, or both towards each other, step 108 (see also FIG. 13). Steps 106-108 are repeated until the smallest unused disk region is greater than or equal to the predetermined size. Together, these two steps have the effect of eliminating the "in-between" small unused disk regions as illustrated by FIG. 13.

Figure 14:
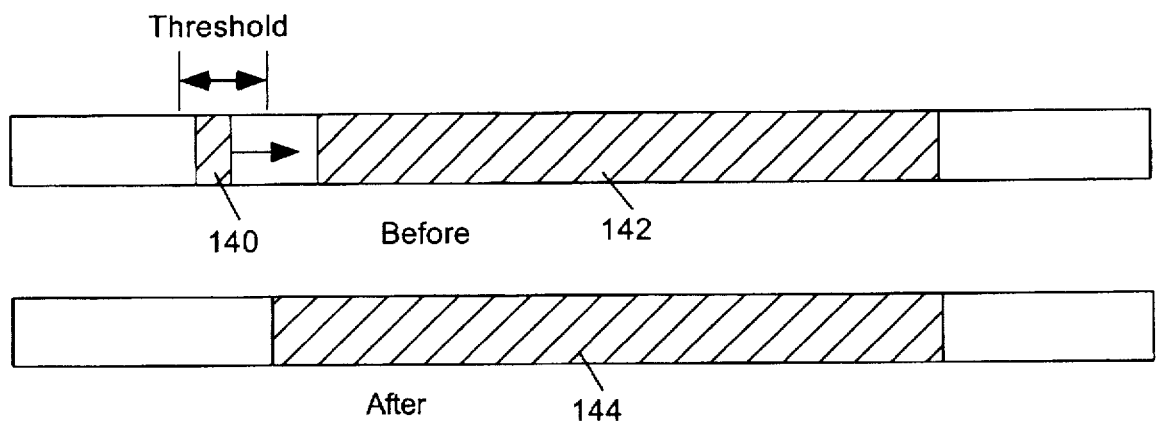

Next, for the illustrated approach, reallocation optimizer 40 determines if the smallest used disk region is smaller than the predetermined size, step 110. If the determination is affirmative, reallocation optimizer 40 reallocates the smallest used disk region, by shifting it towards the closest neighboring used disk region, step 112 (see also FIG. 14). Steps 110-112 are repeated until the smallest used disk region is greater than or equal to the predetermined size. Together, these two steps have the effect of eliminating any "in-between" used disk regions as illustrated by FIG.14.

While at first brush, the two embodiments for generating an alternate disk block allocation that yields improved overall power consumption appear to be very different, as will be appreciated by those skilled in the art, they are really two species of a genus of approaches to practically and optimally solving the cost function of power consumption, expressed in terms of disk block allocation, i.e. Min. C{b1, b2, ..., bn}, where C{ } is the cost function of overall power consumption, and (b1, b2, ... bn) is a set of disk block allocation.

Figure 15:
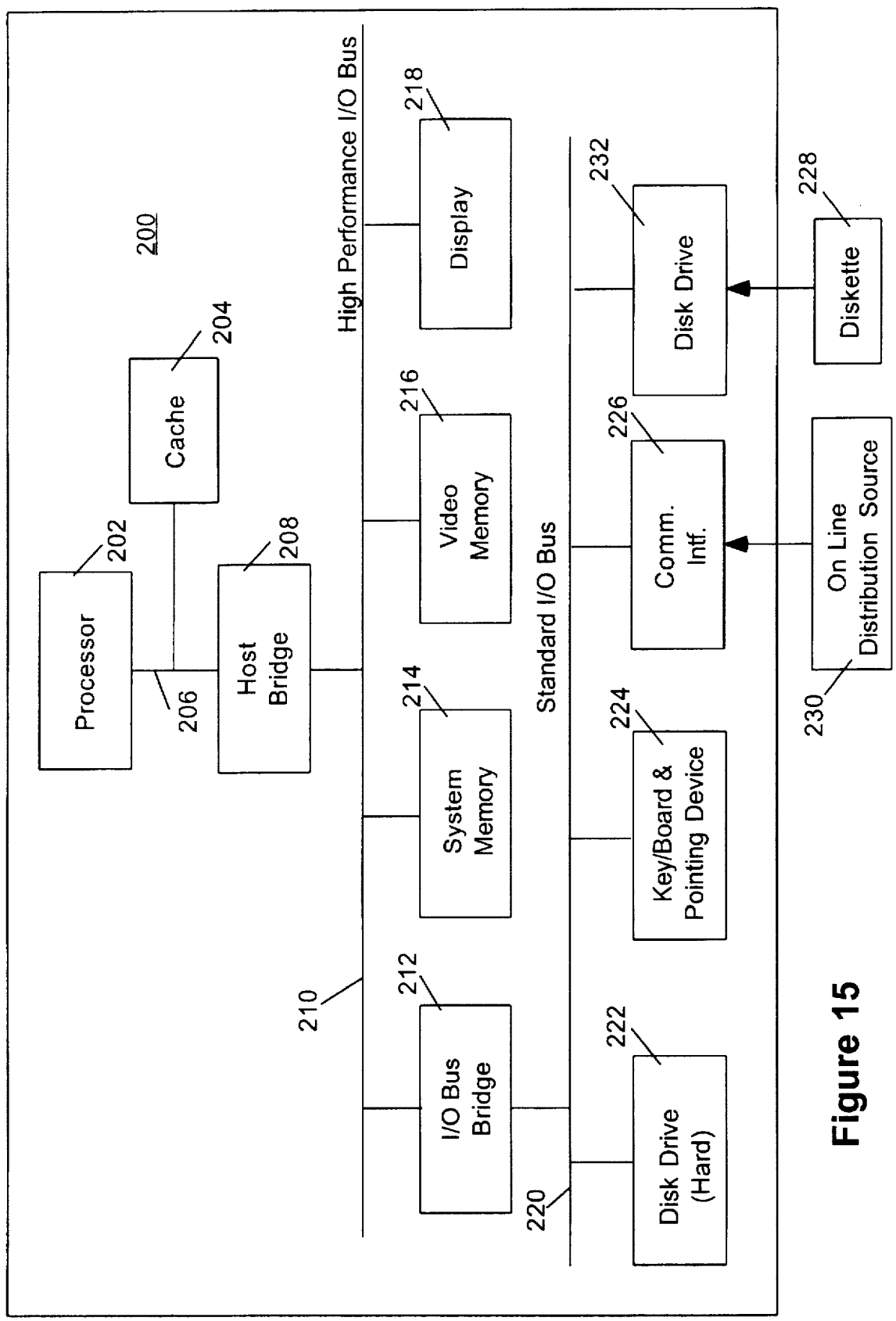
FIG. 15 illustrates one embodiment of a computer system suitable for programming with the embodiment of the present invention illustrated in FIG. 3.

FIG. 15 illustrates one embodiment of a computer system suitable for programming in accordance with the teachings of the present invention described above. As shown, for the illustrated embodiment, computer system 200 includes processor 202, processor bus 206, high performance I/O bus 210 and standard I/O bus 220. Processor bus 206 and high performance I/O bus 210 are bridged by host bridge 208, whereas I/O buses 210 and 212 are bridged by I/O bus bridge 212. Coupled to processor bus 206 is cache 204. Coupled to high performance I/O bus 210 are system memory 214 and video memory 216, against which a video display 218 is coupled. Coupled to standard I/O bus 220 are disk drive 222, keyboard and pointing device 224 and communication interface 226.

These elements perform their conventional functions known in the art. In particular, disk drive 222 and system memory 214 are used to store a permanent and a working copy of the programming instructions for effectuating the teachings of the present invention, when executed by processor 202. The permanent copy may be pre-loaded in factory, loaded from distribution medium 228 or downloaded from on-line distribution source 230. Disk drive 222 and system memory 214 may also be used to store similar copies of application 32 and operating system 34. The constitutions of these elements are known. Any one of a number of implementations of these elements known in the art may be used to form computer system 200.

In one embodiment, computer system 200 is a notebook computer system.

As described earlier, for the standalone implementation, the present invention may also be practiced as an integral function of a disk controller. While the method and apparatus of the present invention have been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus, a method and an apparatus for reducing power consumption by a disk drive have been described.

What is claimed is:

1. An apparatus comprising
   (a) an execution unit for executing programming instructions; and
   (b) a storage medium coupled to the execution unit and having stored therein a plurality of programming instructions to be executed by the execution unit for analyzing trace data of a sequence of disk accesses, the trace data including disk locations accessed and the order the disk locations are accessed, and for generating a new set of disk locations to relocate the contents of the accessed disk locations to reduce power consumed by the disk drive in effectuating access of the relocated contents, the new set of disk locations being generated employing a cost function that relates power consumption by power consuming elements of the disk drive to disk locations and the order the disk locations are accessed.

2. The apparatus as set forth in claim 1, wherein the plurality of programming instructions include programming instructions for tracing the sequence of disk accesses, and generating the trace data.

3. The apparatus as set forth in claim 1, wherein the plurality of programming instructions include programming instructions for generating a remapping vector mapping the disk locations accessed to the new set of disk locations.

4. The apparatus as set forth in claim 3, wherein the plurality of programming instructions include programming instructions for relocating the disk locations accessed to the new set of disk locations using the remapping vector.

5. The apparatus as set forth in claim 1, wherein the plurality of programming instructions include programming instructions for optimizing a cost function that relates power consumption resulted from head movements and active time of electronic components of the disk drive to disk locations and the order the disk locations are accessed, to generate the new set of disk locations.

6. The apparatus as set forth in claim 5, wherein the plurality of programming instructions include programming instructions for generating a new set of disk locations, and determining if the generated new set of disk locations yields reduction in power consumption by the disk drive using the cost function.

7. The apparatus as set forth in claim 6, wherein the plurality of programming instructions further include programming instructions for repeating the generation of an arbitrary set of disk locations, and the determination of whether the generated arbitrary set of disk locations yields reduction in power consumption by the disk drive using the cost function.

8. The apparatus as set forth in claim 5, wherein the plurality of programming instructions include programming instructions for coalescing disk blocks of a disk drive.

9. The apparatus as set forth in claim 5, wherein the plurality of programming instructions include programming instructions for grouping the disk accesses into access runs.

10. The apparatus as set forth in claim 9, wherein the plurality of programming instructions further include programming instructions for generating new disk locations for the disk locations accessed by the various access runs.

11. The apparatus as set forth in claim 10, wherein the plurality of programming instructions further include programming instructions for generating new disk locations from top most portions of a disk region in a top down manner for access runs having run lengths of a first run length kind.

12. The apparatus as set forth in claim 10, wherein the plurality of programming instructions further include programming instructions for generating new disk locations from bottom most portions of a disk region in a bottom up manner for access runs having run lengths of a first run length kind.

13. The apparatus as set forth in claim 10, wherein the plurality of programming instructions further include programming instructions for alternatingly generating new disk locations from top most portions of a disk region in a top down manner and from bottom most portions of the disk region in a bottom up manner for access runs having run length of a first run length kind.

14. The apparatus as set forth in claim 10, wherein the plurality of programming instructions further include programming instructions for generating new disk locations from center portions of a disk region for access runs having run lengths of a first run length kind.

15. The apparatus as set forth in claim 14, wherein the programming instructions for generating new disk locations from center portions of a disk region for access runs having run lengths of a first run length kind, generates the new disk locations factoring into consideration likelihood of occurrence of interrelated access runs of the same first run length kind.

16. The apparatus as set forth in claim 1, wherein the apparatus is a computer system.

17. The apparatus as set forth in claim 16, wherein the programming instructions are part of a service utility.

18. The apparatus as set forth in claim 16, wherein the programming instructions are part of an installation procedure of an application program that makes the sequence of disk accesses.

19. The apparatus as set forth in claim 1, wherein the apparatus is a disk drive controller.

20. A machine implemented method comprising the steps of:
a) tracing a sequence of disk accesses, and generating trace data for the disk accesses traced including disk locations accessed and the order the disk locations are accessed;
b) generating, if possible, a new set of disk locations to relocate the contents of the disk locations accessed, wherein the new set of disk locations are to yield reduction in power consumption by the disk drive when effectuating access of the relocated contents, and the new set of disk locations are to be generated employing a cost function that relates power consumption by power consuming elements of the disk drive to disk locations and the order the disk locations are accessed.

21. The method as set forth in claim 20, wherein the method further includes the step of (c) generating a remapping vector mapping the disk locations accessed to the new set of disk locations, if step (b) was successful in generating the new set of disk locations.

22. The machine implemented method as set forth in claim 21, wherein the method further includes the step (d) relocating the disk locations accessed to the new set of disk locations using the remapping vector, if step (c) was performed.

23. The machine implemented method as set forth in claim 20, wherein step (b) includes optimizing a cost function that relates power consumption of a disk drive resulted from head movements and active time of electronic components of the disk drive to disk locations and the order the disk locations are accessed.

24. The machine implemented method as set forth in claim 23, wherein the cost function optimization of step (b) includes generating a new set of disk locations, and determining if the generated arbitrary set of disk locations yields reduction in power consumption by the disk drive using the cost function.

25. The machine implemented method as set forth in claim 24, wherein the cost function optimization of step (b) further includes repeating the generation of an arbitrary set of disk locations, and the determination of whether the generated arbitrary set of disk locations yields reduction in power consumption by the disk drive using the cost function.

26. The machine implemented method as set forth in claim 23, wherein step (b) further includes coalescing disk blocks of a disk drive.

27. The machine implemented method as set forth in claim 23, wherein step (b) further includes grouping the disk accesses into access runs.

28. The machine implemented method as set forth in claim 27, wherein step (b) the generation of new disk locations for the disk locations accessed of step (b) is performed by generating new disk locations for the various access runs.

29. The machine implemented method as set forth in claim 28, wherein the generation of new disk locations of step (b) includes generating new disk locations from top most portions of a disk region in a top down manner for access runs having run lengths of a first run length kind.

30. The machine implemented method as set forth in claim 28, wherein the generation of new disk locations of step (b) includes generating new disk locations from bottom most portions of a disk region in a bottom up manner for access runs having run lengths of a first run length kind.

31. The machine implemented method as set forth in claim 28, wherein the generation of new disk locations of step (b) includes alternatingly generating new disk locations from top most portions of a disk region in a top down manner and from bottom most portions of the disk region in a bottom up manner for access runs having run length of a first run length kind.

32. The machine implemented method as set forth in claim 28, wherein the generation of new disk locations of step (b) includes generating new disk locations from center portions of a disk region for access runs having run lengths of a first run length kind.

33. The machine implemented method as set forth in claim 32, wherein the generation of new disk locations from center portions of a disk region for access runs having run lengths of a first run length kind, includes factoring into consideration likelihood of occurrence of interrelated access runs of the same first run length kind.

34. A storage medium having stored therein a plurality of programming instructions to be executed by an execution unit for analyzing trace data of a sequence of disk accesses, the trace data including disk locations accessed and the order the disk locations are accessed, and for generating a new set of disk locations to relocate the contents of the accessed disk locations to reduce power consumed by disk drive when effectuating access of the relocated contents, the new set of disk locations being generated employing a cost function that relates power consumption by power consuming elements of the disk drive to disk locations and the order the disk locations are accessed.

35. The storage medium as set forth in claim 34, wherein the plurality of programming instructions include programming instructions for optimizing a cost function that relates power consumption resulted from head movements and active time of electronic components of the disk drive to disk locations and the order the disk locations are accessed, to generate the new set of disk locations.

36. The storage medium as set forth in claim 35, wherein the plurality of programming instructions include programming instructions for generating a new set of disk locations, and determining if the generated new set of disk locations yields reduction in power consumption by the disk drive using the cost function.

37. The storage medium as set forth in claim 36, wherein the plurality of programming instructions further include programming instructions for repeating the generation of an arbitrary set of disk locations, and the determination of whether the generated arbitrary set of disk locations yields reduction in power consumption by the disk drive using the cost function.

38. The storage medium as set forth in claim 35, wherein the plurality of programming instructions include programming instructions for coalescing disk blocks of a disk drive.

* * * * *